United States Patent
Kynast et al.

(10) Patent No.: US 7,835,404 B2
(45) Date of Patent: Nov. 16, 2010

(54) METHOD FOR SYNCHRONIZATION IN A REDUNDANT COMMUNICATION SYSTEM

(75) Inventors: Rigobert Kynast, Lohr am Main (DE); Ludwig Leurs, Lohr am Main (DE); Thomas Schmid, Hafenlohr (DE); Stephan Schultze, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 803 days.

(21) Appl. No.: 11/247,672

(22) Filed: Oct. 11, 2005

(65) Prior Publication Data

US 2006/0114943 A1 Jun. 1, 2006

(30) Foreign Application Priority Data

Oct. 15, 2004 (DE) .................. 10 2004 050 416

(51) Int. Cl.
*H04J 3/06* (2006.01)
*H04B 7/212* (2006.01)

(52) U.S. Cl. .............. 370/509; 370/350; 370/442; 709/208; 709/220; 709/224

(58) Field of Classification Search .......... 331/1 A; 370/401, 452, 509, 235, 229, 230.1, 450, 370/512, 350, 442, 519, 520; 375/356; 700/72; 714/43, 789; 709/208, 220, 243
See application file for complete search history.

(56) References Cited

U.S. PATENT DOCUMENTS

| 5,206,857 | A | | 4/1993 | Farleigh | |
|---|---|---|---|---|---|
| 5,327,468 | A | * | 7/1994 | Edblad et al. | 375/356 |
| 5,361,260 | A | * | 11/1994 | Mito | 370/452 |
| 5,608,354 | A | * | 3/1997 | Hori | 331/1 A |
| 5,815,660 | A | * | 9/1998 | Momona | 709/208 |
| 6,185,217 | B1 | * | 2/2001 | Ando et al. | 370/403 |
| 6,430,218 | B1 | * | 8/2002 | Mito | 375/220 |
| 6,963,944 | B1 | * | 11/2005 | Rettig et al. | 710/305 |
| 7,024,257 | B2 | * | 4/2006 | Pearce et al. | 700/72 |
| 7,076,725 | B2 | * | 7/2006 | Ikeda et al. | 714/789 |
| 7,119,505 | B2 | * | 10/2006 | Komaki et al. | 318/113 |
| 7,143,301 | B2 | * | 11/2006 | Pearce et al. | 713/401 |
| 7,272,152 | B2 | * | 9/2007 | Gross et al. | 370/447 |
| 7,349,339 | B2 | * | 3/2008 | Meckelburg et al. | 370/235 |
| 7,460,471 | B2 | * | 12/2008 | Pearce et al. | 370/226 |

(Continued)

FOREIGN PATENT DOCUMENTS

DE 43 20 137 A1 12/1993

(Continued)

*Primary Examiner*—William Trost, IV
*Assistant Examiner*—Emmanuel Maglo
(74) *Attorney, Agent, or Firm*—Michael J. Striker (57) ABSTRACT

With a method for synchronization in a redundant communication system that includes a central participant and at least one further participant, at least one of the further participants being synchronized with the central participant, and, to this end, at least two telegrams containing synchronization information being transmitted by the central participant to the at least one further participant, if there is a transmission error involving a telegram containing synchronization information, it is still possible to carry out synchronization due to the fact that, based on the synchronization information contained in the at least two telegrams, resultant synchronization information is obtained and is used to synchronize the further participants with the central participant.

20 Claims, 4 Drawing Sheets

U.S. PATENT DOCUMENTS

| | | | |
|---|---|---|---|
| 2002/0040452 A1* | 4/2002 | Birk et al. .................... | 714/43 |
| 2002/0110155 A1* | 8/2002 | Pearce et al. ................ | 370/519 |
| 2005/0063396 A1* | 3/2005 | Yu ............................. | 370/401 |

FOREIGN PATENT DOCUMENTS

| | | |
|---|---|---|
| DE | 692 14 873 T2 | 5/1997 |
| DE | 197 04 021 A1 | 5/1998 |
| DE | 199 17 354 A1 | 10/2000 |
| DE | 692 32 158 T2 | 7/2002 |

* cited by examiner

METHOD FOR SYNCHRONIZATION IN A REDUNDANT COMMUNICATION SYSTEM

CROSS-REFERENCE TO A RELATED APPLICATION

This application contains a subject matter which is substantially similar to the subject matter of U.S. patent applications Ser. Nos. 11/247,673 and 11/247,829,

BACKGROUND OF THE INVENTION

The present invention relates to a method for synchronization in a redundant communication system that includes a central participant and at least one further participant, at least one of the further participants being synchronized with the central participant, and, to this end, at least two telegrams containing identical synchronization information is transmitted by the central participant to the at least one further participant. The present invention further relates to a redundant communication system and a corresponding automation system.

Communication systems are known from the related art. Distributed communication systems, in particular, are utilized in many technical applications. Distributed communication systems are used, e.g., in automation systems based on decentralized control and drive system engineering, in which a large number of individual systems are often controlled and driven in a temporally synchronized manner. An example of a single system of this type is a drive unit, e.g., with a synchronous or asynchronous motor used to drive one of many axes that function in a manner such that they are mutually interpolating or closely interconnected. Typical fields of application of automation systems of this type based on decentralized control and drive system engineering are printing machines or machine tools, and robotic systems with a large number of conveying and operating elements harmonized with respect to time.

Figure 1:
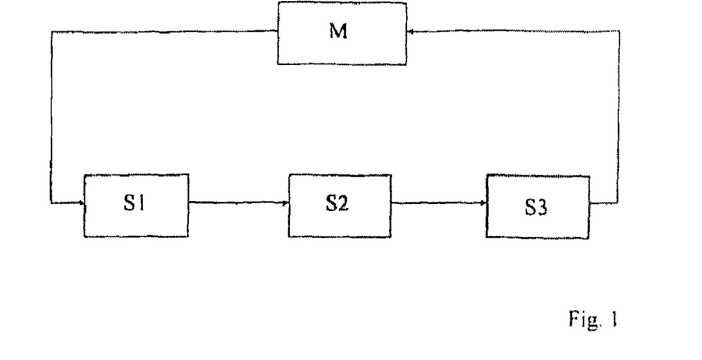
FIG. 1 Shows a schematic depiction of a communication system known from the related art, which is located in a ring structure.
Figure 2:
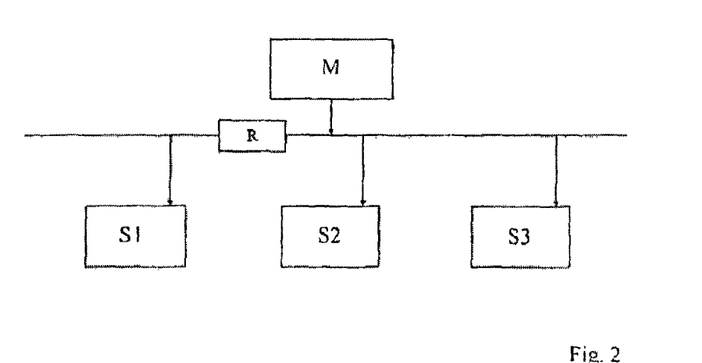
FIG. 2 Shows a schematic depiction of a communication system known from the related art, which is located in a bus topology.
Figure 3:
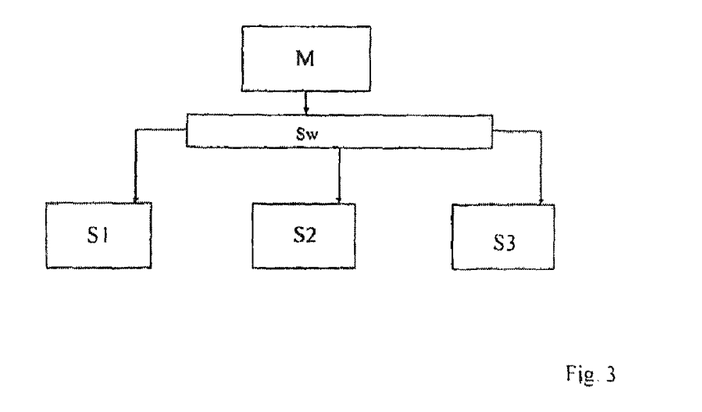
FIG. 3 Shows a schematic depiction of a comm unication system known from the related art, which is located in a star topology.

Communication systems of this type include at least two, but usually many more participants, which are preferably configured and/or arranged in a hierarchical structure, with one participant being configured as the central participant and the remaining participants being configured and/or arranged as further participants in the communication system. A hierarchical architecture of this type is known, e.g., as a master-slave structure with the central or main participant as the "master" or "master participant" (main station), and the further participants as "slaves" or "slave participants" (substations or secondary stations). The main participant is designed as the central participant that generates and sends control signals to the further participants. The further participants are in communication contact with the central participant to receive these control signals and to communicate further with the central participant, as necessary, and they are typically in communication contact with the other participants as well. The slave participants are usually process interfaces, such as sensors and actuators, i.e., input/output assemblies for analog and digital signals, and drives. Signal processing, with data preprocessing, must be decentralized among the slave participants to keep the quantity of data to be transmitted low. This requires that the master participant and the further slave participants communicate with each other. In this regard, three basic architectures ("topologies") are known from the related art. They are illustrated in FIGS. 1 through 3. In FIG. 1, central participant M and further participants S1, S2, S3 are interconnected in a ring structure. A signal generated by central participant M travels around the ring and therefore passes each of the other participants S1, S2, and S3 in series. FIG. 2 shows a bus topology with a centralized bus line to which central participant M and further participants S1, S2 and S3 are connected. The signal and data transfer is accomplished via a data bus in a known manner. When the central bus line has long paths, it is common to interconnect a "repeater" R in the central bus line to amplify the signal. The third structure shown in FIG. 3 is a star architecture with a central switching element Sw (a "switch") integrated in the connecting line. A signal generated by central participant M is relayed via switching element Sw to participant S1 or S2 or S3 specified as the receiver.

The three topologies shown in FIGS. 1 through 3 can also be part of a more complex system in which a plurality of basic architecture designs are realized in an interconnected manner. In this case, one of the central participants or a superordinate central participant has the task of generating a superordinate control signal.

Distributed communication systems are also known from the related art, with which the master function can be transferred among a plurality of participants or even among all participants. A requirement of "multi-master" systems of this type is that a plurality of participants have the functionality of a central participant and that they exercise this functionality when a defined condition exists. In this process, a participant that previously served as a further participant becomes the central participant, and the previous central participant becomes the further participant in the communication system. A possible condition for a transfer of this type can be, e.g., the absence of a control signal from the previous central participant.

Figure 4:
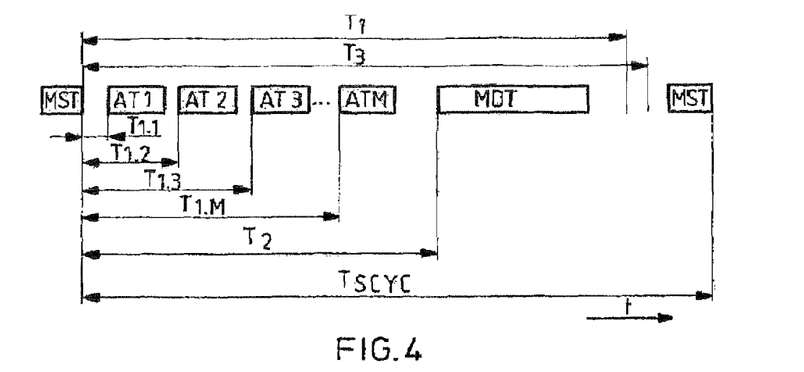
FIG. 4 Shows a schematic depiction of the phases of the communication cycle of the SERCOS interface®—which is known from the related art—that are used for synchronization and regular operation.

The applicant currently offers a distributed communication system of this type with a ring-type structure on the market, called the SERCOS Interface® (SErial Real Time COmmunication System). This system generates and sends control signals via a central participant to further participants. The further participants are typically connected with the central participant via optical waveguides. The SERCOS interface® specifies strictly hierarchical communication. Data are exchanged in the form of data blocks, the "telegrams" or "frames", between the controller (master) and the substations (slaves) in temporally constant cycles. The further participants and/or substations do not communicate directly with each other. In addition, data contents are specified, i.e., the significance, depiction and functionality of the transmitted data are predefined to a significant extent. With the SERCOS interface®, the master connects the controller to the ring, and a slave connects one or more substations (drives or I/O stations). A plurality of rings can be linked to one controller, with the controller being responsible for coordinating the individual rings with each other. This is not specified by the SERCOS interface®. This communication system is preferably used for the closed-loop and open-loop control of distributed motors, e.g., synchronous or asynchronous motors. The further participants in the communication system are, therefore, the control devices for the closed-loop and open-loop control of a motor. The main applications for this communication system are, in particular, drives of machine tools, printing presses, operative machines, and machines used in general automation technology. With the SERCOS interface® there are five different communication phases. The first four phases (phase 0 through phase 3) serve to initialize the participants, and the fifth phase (phase 4) is regular operation. Within one communication cycle, every substation exchanges data with the controller. Access to the ring is deterministic within collision-free transmission time slots. FIG. 4 shows a schematic depiction of the communication cycle of regular operation, i.e., communication phases 3 and 4 of the SERCOS interface®. With the SERCOS interface® there are three types of telegrams: Master Synchronization Telegrams, Acknowledge Telegrams and Master Data Telegrams. Master Synchronization Telegrams (MST) are sent out by the master participant. They contain a short data field, are used to define the communication phase and serve as the "clock". Acknowledge Telegrams (AT) are sent by slave participants and include, e.g., actual values of a drive controlled by the particular slave participant. Master Data Telegrams (MDT) are summation (framework) telegrams that contain data fields for all slave participants. The master uses Master Data Telegrams to transmit setpoint values to each slave. During initialization, every substation is notified of the start and length of its (sub-) data field. The SERCOS interface® defines the following types of data, i.e., operating data, control and status information, and data transmitted in a non-cyclic manner. Operating data (process data) are transmitted in every cycle. Examples include setpoint values and actual values.

The length of the operating data range is parametrizable. It is established during initialization and remains constant during operation of the ring. The control information transmitted by the master participants to the slave participants, and the status information sent by the slave participants to the master participants are, e.g., release signals and "ready" messages. Data transmitted in a non-cyclic manner (service channel) include setting parameters, diagnostic data and warnings. Command sequences are also controlled via this non-cyclic transmission. As shown in the schematic depiction in FIG. 4, a communication cycle is started by the central participant sending out an MST. All communication-specific times are based on the end of this short (approx. 25 □s-long) telegram. The substations now send their Acknowledge Telegrams (AT) in succession, in their respective transmission time slots, starting with $T_{1,i}$. After the last AT, the master sends the MDT, starting at $T_2$. The next cycle begins with another MST. The time interval between two MSTs is referred to as SERCOS cycle time $T_{SYNC}$. With the SERCOS interface®, communication is synchronized with the end of the MST. A synchronization telegram is generated by the central participant—preferably at equidistant intervals—and fed into the communication ring. In the closed-loop controllers, a time parameter typically links receipt of the synchronization telegram and the synchronization signal with the processing of setpoint/actual values, which results in a determination and allocation of open-loop and closed-loop parameters to the particular servo motors.

Synchronization of the participants is of prime importance. If inaccuracies occur in the synchronization of the further participants with the central participant, the processes controlled by the further participants are not carried out in a synchronized manner. For example, the printed image produced by a printing press with servomotors controlled by a conventional communication system of this type can be blurred as a result of inadequate synchronization of the motion sequences. The same applies for machine tools or other automation machines that require highly-exact synchronization of processes. In the case of machine tools, for example, faulty synchronization can result in inexact machining of a workpiece, since, e.g., individual axes (e.g., x, y and z-axes) move such that they are temporally unsynchronized.

Due to the significance of synchronization of the further participants with the central participant described above, an error in a telegram containing synchronization information sent out by the central participant is extremely problematic.

If a telegram containing synchronization information was corrupted in a communication cycle, as can be detected by evaluating the checksum, drives cannot be controlled exactly in this communication cycle, for example. It is therefore necessary to design the communication system and its protocols such that the likelihood of a telegram containing faulty or destroyed synchronization information is minimized.

SUMMARY OF THE INVENTION

The object of the present invention, therefore, is to avoid the disadvantages of the related art and, in particular, to further develop a synchronization method of the type described initially such that synchronization can still be carried out if a transmission error occurs with a telegram containing synchronization information.

This object is attained using a method of the type described initially by the fact that, based on the synchronization information contained in the at least two telegrams, resultant synchronization information is obtained and is used to synchronize the further participants with the central participant.

According to the present invention, redundancy is therefore used in the synchronization. In a redundant communication system, the preferably identical synchronization information sent out by the central participant typically reaches the further participants more than once—and at different points in time—via different transmission paths, e.g., in a double-ring system with rings moving in both directions. The synchronization information need not be identical. For example, a different data protocol can be applied to the primary ring and the secondary ring. It is preferable, in particular, for at least two synchronization signals to arrive. For the communication protocol, synchronization of the further participants with the central participant must be carried out unambiguously, but additional synchronization information provided for redundancy is not easily integrated in the protocol for this purpose. In other words, the redundancy provided in case an error occurs is not required if an error does not occur and, in this case, results in system behavior that is not unambiguous, since the synchronization triggering is not unambiguous. The latter also applies in a case in which an error occurs using a redundancy solution with more than two telegrams containing synchronization information when the number of missing telegrams is small. Synchronization is not unambiguous in this case, either. This problem is eliminated by the present invention by the fact that resultant synchronization information is formed that contains all synchronization information that was transmitted in redundancy. This applies primarily when an error does not exist. Error-free operation is therefore ensured in this case. The resultant synchronization information is also formed such that, when an error occurs, i.e., when at least one piece of synchronization information is missing, resultant synchronization information can still be formed that is sufficient for operation of the communication system according to the present invention in the communication cycle containing the error.

Advantageously, synchronization pulses are formed based on each piece of synchronization information contained in the at least two telegrams, logical operations or logical ORing functions being applied to the synchronization pulses to create a resultant synchronization pulse to form the resultant synchronization information. The conversion of the synchronization information typically present as phase information into synchronization pulses simplifies implementation of the method according to the present invention in terms of circuit engineering. By providing a logical OR circuit, it can be ensured that a resultant synchronization pulse can be formed when an error exists or does not exist. This does not apply for the case, however, in which all telegrams containing synchronization information in the redundant communication system were corrupted or contain errors. This case becomes less likely, however, as the number of telegrams containing synchronization information increases. In particular, when the at least two telegrams containing synchronization information are sent by the central participant to the further participant via different transmission paths, it is relatively unlikely in practice that synchronization of the further participant will fail in this communication cycle. As an alternative, or in addition to ORing the trigger signals, other logical operations are also feasible, of course (e.g., ANDing. . . . ). ANDing is advantageous in particular when inverse logic is used.

Advantageously, after logical operations are applied to the synchronization pulses, the resultant synchronization pulse is discriminated out of the resultant signal. This serves to prevent a double pulse that would otherwise be present under certain circumstances and that can be produced by the jitter of the two pulses after the logical operation is applied. Discrimination is therefore advantageous in that it creates the unambiguity required for the synchronization out of the redundant synchronization information. "Jitter" is understood, in particular, to be "phase jitter" that exists due to movement of the transmitted signal or the corresponding telegram through time or phase. The amount of jitter increases, e.g., when long cables, poor cables and signals with high transmission rates are used.

According to an embodiment which is preferred in terms of circuit engineering, a monoflop is used to discriminate the resultant synchronization pulse. A monoflop or a monostable trigger circuit does not change continually. Instead, it has only one stable state. The second state is stable only for a certain period of time as determined by the dimensional design, i.e., the "monoflop duration". When this time expires, the circuit automatically returns to the stable state. The monoflop circuit is therefore also referred to as a time switch, a univibrator or one-shot. Preferably, the monoflop duration is designed to be greater than the expected jitter of the at least two synchronization pulses. Basically, however, discrimination with respect to time can also be used to discriminate the resultant synchronization pulse by forming resultant synchronization information, e.g., using appropriate timing. For example, discrimination with respect to time can consist of defining various time windows, the resultant synchronization information corresponding exactly to a synchronization pulse that occurs in one of the time windows, an order of priority having been specified for the individual time windows. The first synchronization pulse that occurs per the order of priority of the time windows is then used, e.g., as the resultant synchronization pulse to synchronize the further participant with the central participant during the communication cycle.

Advantageously, the synchronization pulses are shifted as to time before the logical operation is applied such that they are substantially superimposed. It is preferable for both synchronization pulses to be delayed with respect to time, the difference between the two delays corresponding to the time interval between receipt of the two synchronization pulses by the further participant. It is therefore preferred to combine a logical operation with time elements such that the two synchronization pulses become superimposed when an error does not exist. If one of the two pulses is missing, synchronization jitter therefore does not occur.

According to a further exemplary embodiment of the present invention, the resultant synchronization information is synchronization information from a predetermined one of the at least two telegrams. While this variation of the present invention is advantageous in principle, since the unambiguity desired for synchronization in terms of the redundant synchronization information is given, it is disadvantageous that a resultant synchronization pulse cannot be formed or determined if the synchronization pulse used is missing. The aspect of redundancy is impaired in this regard.

Further preferred exemplary embodiments of the present invention are disclosed in the dependent claims.

The present invention, further features, objectives, advantages and possible applications of the same are described in greater detail below based on the description of preferred exemplary embodiments, with reference to the attached drawings. In the drawing, the same reference numerals describe the same corresponding elements. All of the features described and/or depicted graphically represent the subject of the present invention, either alone or in any reasonable combinaton and, in fact, independently of their wording in the claims or their back-references. In the drawing:

DESCRIPTION OF THE PREFERRED EMBODIMENTS

Figure 5:
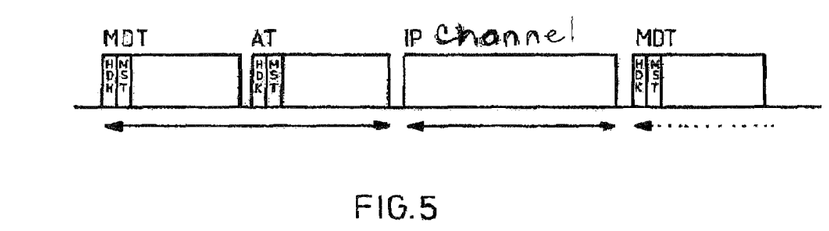
FIG. 5 Shows a schematic depiction of an exemplary embodiment of the phase of the communication cycle of the communication system according to the present invention provided for synchronization and regular operation.

The operating phase of communication carried out by the communication system according to the present invention is depicted schematically in FIG. 5 for the case of cyclic communication. In FIG. 5 it is shown that data telegrams are exchanged between a central participant or master participant (or main station) and at least one further participant (slave participant or sub- or secondary station). The central participant is the station with which the secondary stations are to be synchronized. The data telegram sent out by the central participant, e.g., along a ring (refer to FIG. 1), is labeled MDT (="Master Data Telegram"). The data telegram of the at least one secondary station is labeled AT (="Acknowledge Telegram"). Only one acknowledge telegram is shown in FIG. 5.

It can correspond to a case in which only one participant is provided (refer to FIG. 4). It is preferred, however, that the acknowledge telegram AT depicted in FIG. 5 is a summation telegram and includes corresponding telegram areas for a large number of further participants. For example, setpoint values for actuators to be controlled by the secondary stations are contained in the Master Data Telegram MDT. The Acknowledge Telegram AT contains, e.g., corresponding actual values for replying to the central participant. According to the current exemplary embodiment of the present invention, the synchronization information is not in the form of a dedicated Master Synchronization Telegram MST (refer to FIG. 4). Instead, the synchronization information is a data field MST in the Master Data Telegram MDT. The exact structure of the Master Data Telegram MDT is described in greater detail below with reference to FIG. 6. It has been noted, in this context, that the Master Synchronization Information Field MST is embedded at the beginning or in a front region of the Master Data Telegram MDT behind a header HDR. To simplify implementation of the communication system according to the present invention in the hardware and software, the Acknowledge Telegram AT has the same structure as the Master Data Telegram MDT, although the Acknowledge Telegram typically does not transmit synchronization information to the main station. This is advantageous, because both types of telegrams, i.e., MDT and ST, have the same offset in terms of the actual data, such as setpoint values and actual values. The part of the communication that includes the Master Data Telegram and at least one Acknowledge Telegram is labeled "RT channel" in FIG. 5. As an option, the communication cycle can contain an IP channel as well as this RT channel. The IP channel is a time slot for transmitting data encoded in accordance with the Internet protocol. The duration of the communication cycle is also shown in FIG. 5. In accordance with the duration of the communication cycle in the SERCOS interface® (refer to FIG. 4)—in the case of which the duration is defined as extending from the end of one Master Synchronization Telegram to the end of the subsequent Master Synchronization Telegram—the communication cycle in the case of the communication system according to the present invention is defined as the "interval" from the end of the Master Synchronization Information Field of a Master Data Telegram to the end of the Master Synchronization Information Field of a subsequent Master Data Telegram. The next communication cycle therefore starts with the portion of the Master Data Telegram that follows the Master Synchronization Information Field, as indicated by the dotted arrow, which schematically represents the successive RT channel of the next cycle.

Figure 6:
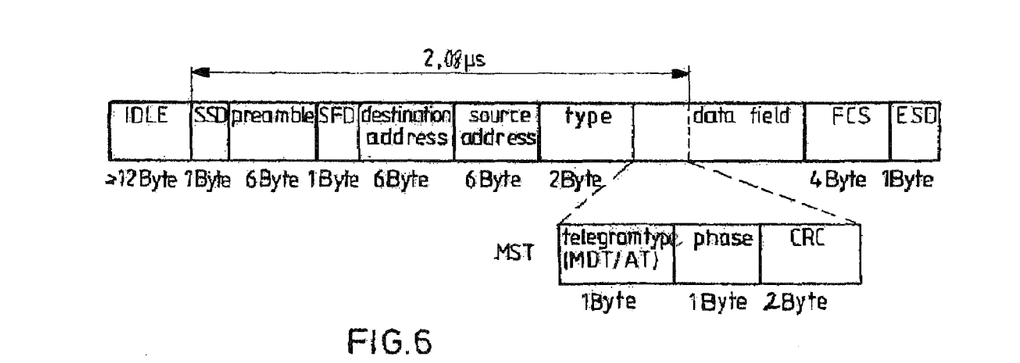
FIG. 6 Shows a schematic depiction of a preferred telegram structure with embedded synchronization information of the communication system according to the present invention.

The structure of the Master Data Telegram is shown schematically In greater detail in FIG. 6. An idle phase ("IDLE") that is at least 12 bytes long is provided before the start of the actual Master Data Telegram. The Master Data Telegram starts with a data field that is 1 byte in length. It is referred to as SSD ("Start Stream Delimiter"). This is a prefix that delineates the start of a transmitted data stream. This is followed by a preamble with a length of 6 bytes. The preamble can have the function of providing a start-up time for the hardware of the electronics in the communication system according to the present invention to detect that a telegram has been transmitted. This is followed by a data field SFD ("Start Frame Delimiter") that delineates the start of the actual telegram or frame. The SFD field is 1 byte long. This is followed, in the Master Data Telegram, by the destination address and the source address for the telegram. Each of these two data fields has a length of 6 bytes. Following this is a type field which is 2 bytes long and is used to identify which type of network protocol is used in the subsequent data field. The data field itself comes next; its length is not specified exactly. For an Ethernet application, the data field can be up to 1,500 bytes long. The length of the data field typically depends on how many and which data are transmitted in the telegram. It is provided that an FCS ("Frame Check Sequence") checksum 4 bits in length follows the data field. The FCS field therefore contains a checksum that enables the integrity of the data in the entire telegram to be checked. The transmitted data are ended by the 1-byte long field ESD ("End Stream Delimiter"), which is a suffix and is the end of the transmitted data stream.

The Master Synchronization Information Field is a portion of the data field of the telegram according to the present invention. More precisely, it is embedded in the Master Synchronization Information Field at the beginning of the data field. The Master Synchronization Information Field has a constant length and has a starting field with a length of one byte, in which the telegram type is specified. In this field, it is specified in particular whether the current telegram is a Master Data Telegram MDT or an Acknowledge Telegram AT. As explained above, the synchronization information is only ever required for a Master Data Telegram, since the secondary stations are to be synchronized with the central participant (=master). To simplify implementation in hardware and software, however, it is preferable for the Acknowledge Telegrams to have the same structure as the Master Data Telegram. An Acknowledge Telegram can therefore also contain the Master Synchronization Information Field. For this case, the "Telegram type" field should therefore be filled with the information about the secondary station. The synchronization information itself is transmitted in a subsequent field ("phase") with a length of one byte. The Master Synchronization Information Field ends with a CRC field (="Cyclic Redundancy Check"), which uses a cyclic redundancy check to check the integrity of the data from the beginning of the data stream, i.e., from the SSD field to the phase field of the Master Synchronization Information Field. The CRC checksum is a unique number obtained by applying a polynomial to the bit pattern extending from the SSD field to the phase field. The same polynomial is used at the receiving station of the data telegram to generate a further checksum. The two checksums are compared to determine whether the transmitted data have been corrupted. As shown in FIG. 6, the end of a CRC field has a constant time interval from the beginning (start of the SSD field) of the Master Data Telegram. This constant time interval is preferably approximately a few microseconds long. In the exemplary embodiment shown, it is 2.08 microseconds long. According to an alternative preferred embodiment of the present invention, a 4-byte long CRC field can also be used. The time interval is then preferably 2.24 microseconds (this corresponds to 28 bytes =224 bits).

Figure 7:
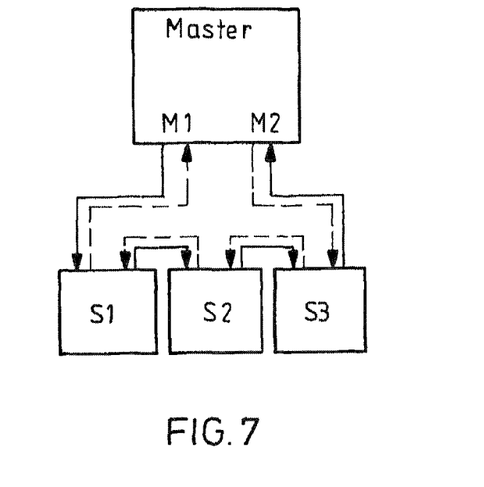
FIG. 7 Shows a schematic depiction of a communication system with a double-ring topology known from the related art.

A redundant communication system of the type used in conjunction with the present invention is shown in FIG. 7. A double-ring system with two active rings moving in both directions is shown. Communication takes place simultaneously on both rings. The present invention is not limited to the structure shown, however. Further exemplary embodiments of the redundant communication system can be different communication systems and other topologies, e.g., redundant line structures. The communication system shown has two central participants M1 and M2, and three further participants S1, S2 and S3. The ring that runs in the counterclockwise direction as shown in FIG. 7 is referred to as ring 1, while the other ring—which runs in the clockwise direction—is referred to as ring 2. Ring 1 extends from central participant M1 to an input of participant S1. The further course of ring 1 then extends from an output of participant S1 to an input of participant S2. Ring 1 continues from an output of participant S2 to an input of participant S3 and from an output of participant S3 to second central participant M1. The two central participants M1 and M2 can be interconnected, of course. Accordingly, ring 2 extends from an output of central participant M2 to an input of participant S3, from an output of participant S3 to an input of participant S2, from an output of participant S2 to an input of participant S1, and from an output of participant S1 to an input of further central participant M1. The two rings, eg., ring 1 and ring 2, are advantageously not operated independently of each other. To ensure reliable channel capacity for real-time requirements when an error occurs, the same information is exchanged on both rings so that, as a result of the simultaneous transmission on both rings and the increased redundancy, improved error tolerance to missing data blocks can be attained.

Figure 8A:
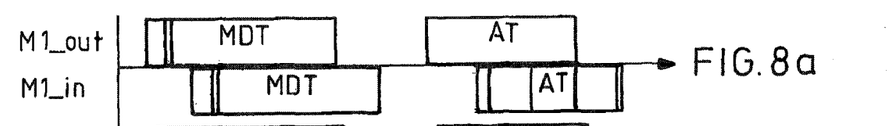
FIGS. 8a through 8e Show schematic depictions of the communication taking place in FIG. 7, FIGS. 8a through 8e each showing the telegrams transmitted in the communication system with the particular participants of the communication system.
Figure 8B:
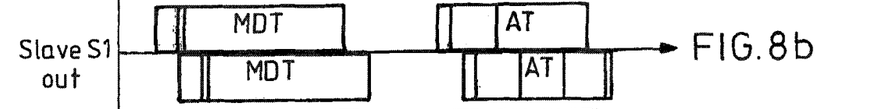
Figure 8C:
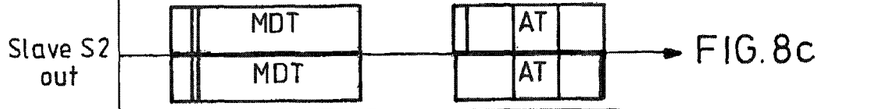
Figure 8D:
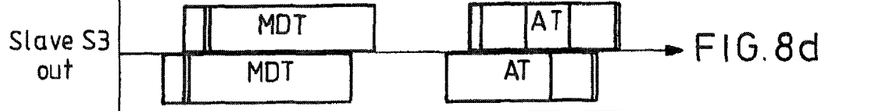
Figure 8E:
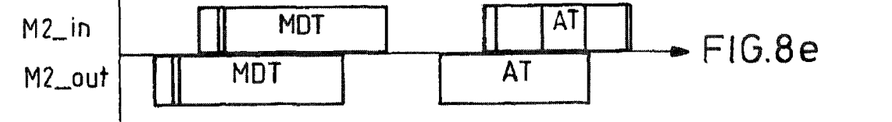

FIGS. 8a through 8e depict the transmission of telegrams on the two rings according to FIG. 7. The traffic at the various interfaces on ring 1 is shown in the top half of each of the FIGS. 8a through 8e, while the traffic at the various interfaces on ring 2 is shown in the lower half of each of the FIGS. 8a through 8e. Shown in the upper half of FIG. 8a, therefore, is the output of central participant M1, which is a component of ring 1. Shown in the lower half of FIG. 8a is the input of central participant M1, which is a component of ring 2. Accordingly, the upper half of FIG. 8a shows an output of further participant S1, which is a component of ring 1. The lower half of FIG. 8b shows a further output of participant S1, which is a component of ring 2. Accordingly, the upper half of FIG. 8c shows an output of participant S2, which is a component of ring 1. The lower half of FIG. 8c shows a further output of participant S2, which is a component of ring 2. Accordingly, the upper half of FIG. 8d shows an output of participant S3, which is a component of ring 1. The lower half of FIG. 8d shows a further output of participant S3, which is a component of ring 2. The input of central participant M2, which is a component of ring 1, is shown in the upper half of FIG. 8e. The output of central participant M2, which is a component of ring 2, is shown in the lower half of FIG. 8e. The telegrams depicted in FIGS. 8a through 8e, namely a Master Data Telegram MDT and an Acknowledge Telegram AT, both of which are configured as summation telegrams, correspond to the exemplary embodiments described above in conjunction with FIGS. 5 and 6. When FIGS. 8a through 8e are compared, it becomes clear that the transmission of the telegrams along the ring results in a corresponding time delay. The telegrams basically reach the individual participants of the communication depicted in FIG. 7 at different points in time. This applies in particular for participants Ml, S1, S2 and M2 shown in FIGS. 8a, 8b, 8d and 8e.

Due to the symmetry of the system, the corresponding telegrams arrive simultaneously at participant S2 (refer to FIG. 8c). In the right half of FIGS. 8a through 8e in particular, which show the acknowledge telegram configured as a summation telegram, it is clear that a front, middle and rear section of the acknowledge telegram is provided in each case for the three further participants S1, S2 and S3. When a section passes through participant S1, S2 or S3, it is filled with data, e.g., actual-value data, from the particular participant. In the present exemplary embodiment, the synchronization information is not transmitted as it is in the related art (refer to FIG. 4) using a Master Synchronization Telegram. Instead, according to the present exemplary embodiment of the present invention (refer to FIGS. 5 and 6), the synchronization information is transmitted embedded in the Master Data Telegram, which results in increased protocol efficiency. The present invention is not limited thereto, however, and can also be used with a dedicated Master Synchronization Telegram MST (refer to FIG. 4). Per the depiction shown in the left half of FIGS. 8a through 8e, it is clear that the synchronization information, i.e., data field MST of the Master Data Telegram MDT, arrives at the particular participant S1, S2 and S3 at different times. As noted above, only participant S2 receives the synchronization information from both rings simultaneously, for reasons of symmetry. As a result of the present invention, the redundant synchronization information, which arrives at each participant in duplicate when an error does not exist, is used for synchronization. The different transit times differ from further participant to further participant, but they are known by the further participant and can therefore be compensated for. The procedure used to create an unambiguous specification for synchronization triggering based on the synchronization information received by the further participants at different points in time is described in greater detail below with reference to FIG. 9.

Figure 9:
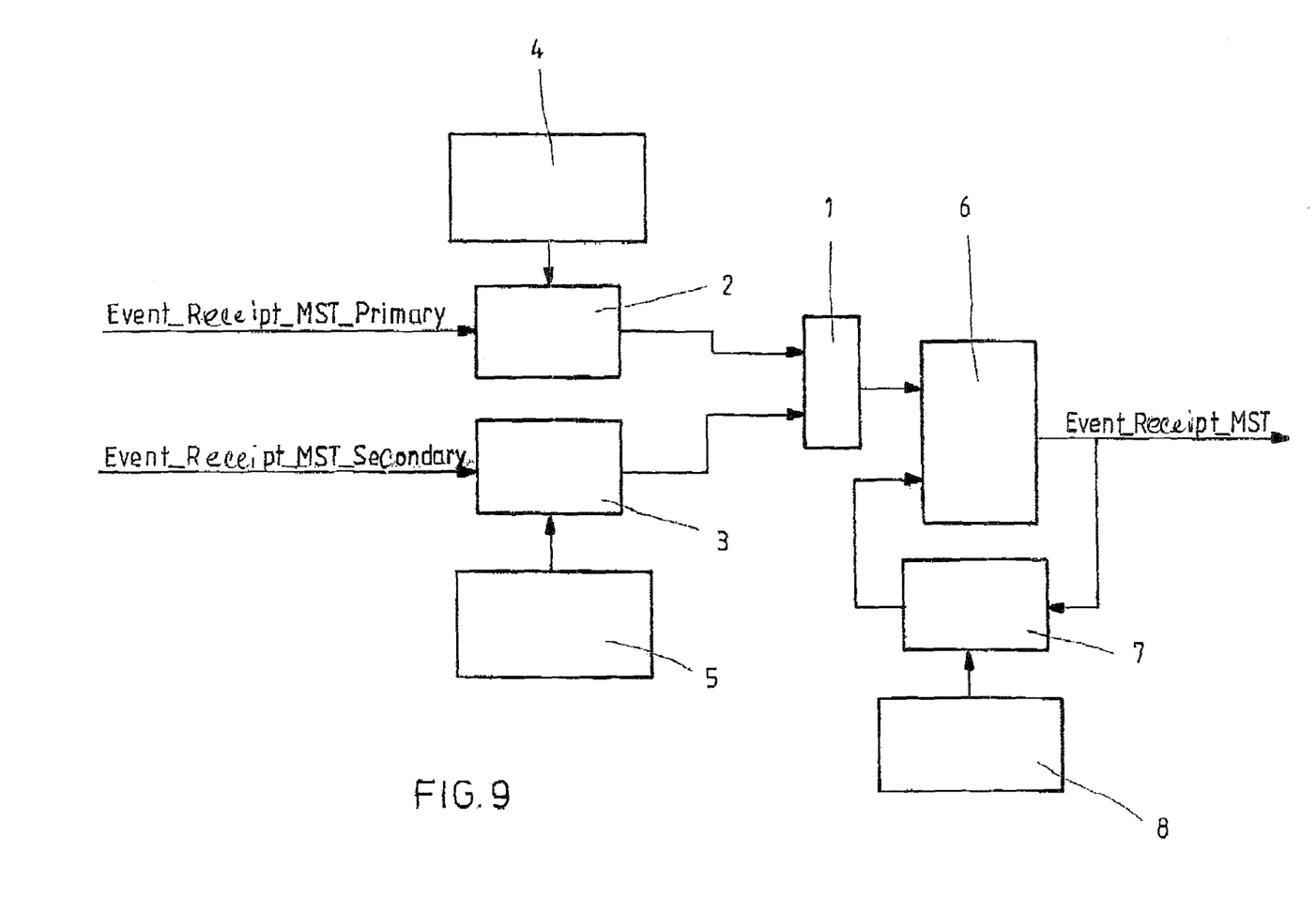
FIG. 9 Shows a schematic depiction of a circuit for forming a synchronization pulse, according to an exemplary embodiment of the present invention.

A schematic block diagram is shown in FIG. 9. It depicts a preferred circuit arrangement for creating a resultant synchronization pulse Event$_{Receipt}$_MST from the synchronization pulse from the first Rings Event_Receip_MST_Primary and the synchronization pulse of the second Rings Event_Receipt_MST_Secondary. The central element of the circuit arrangement shown in FIG. 9 is an OR logical circuit element and logic gate 1 which creates a single signal from the two preprocessed synchronization pulses from the first and second ring, i.e., the synchronization pulse Event_Receipt_MST_Primary and Event_Receipt_MST_Secondary. The preprocessing of the two synchronization pulses from the first and second ring is carried out by respective delay circuits 2 and 3 in the form of respective delays, which generally function independently of each other. The value of the time delay of delay circuit 2 is obtained from a register 4 and, accordingly, the value of delay circuit 3 is obtained from a register 5. According to a preferred embodiment, the later of the two synchronization pulses Event Receipt_MST_Primary and Event_Receip_MST_Secondary is not delayed, i.e., the corresponding value of the delay of delay circuit 2 and 3 assigned to later synchronization pulse will be zero, and only the earlier of the two synchronization pulses is delayed. Advantageously, the extent of the delay in this case is such that the two synchronization pulses become superimposed when an error does not exist. When an error does not exist, this ensures that only one resultant synchronization pulse is created from the two synchronization pulses that were received. The two synchronization pulses—which are delayed under certain circumstances—in the first and second ring are applied to the input of the OR circuit 1. The output of OR circuit 1 is connected with the "Set" input of monoflop 6. In a manner known according to the related art, a time-control element or delay 7 is back-coupled with the reset input via the output of monoflop 6. Via delay circuit 7, which obtains a value for delay from a register 8, the switch-on time or monoflop duration of monoflops 6 can be specified. Monoflop 6 basically has only one stable state, e.g., 0 Volt. The second state is stable only for a certain period of time as determined by the dimensional design, i.e., the value of the switch-on time specified in register 8. When this period expires, the circuit automatically returns to the stable state. The switchover to the second state is triggered by the presence of at least one synchronization pulse, Monoflop 6 and delay circuit 7 in conjunction with register 8 therefore form a circuit arrangement that produces a synchronization pulse having the length of the value stored in register 8 if (as specified by OR circuit 1) at least one of the two synchronization pulses Is received.

According to a preferred embodiment of the present invention, the monoflop duration or switch-on time is designed to be greater than the expected jitter of the two synchronization pulses.

The present invention was explained in greater detail above with reference to preferred exemplary embodiments of the same. For one skilled in the art it is obvious, however, that different transformations and modifications can be made without deviating from the idea on which the present invention is based.

What is claimed is:

1. A method for synchronization in a redundant communication system that includes a central participant and at least one further participant, comprising the steps of:
    synchronizing the at least one further participant with the central participant including transmitting at least two telegrams containing synchronization information by the central participant to the at least one further participant;
    based on the synchronization information contained in the at least two telegrams, forming resultant synchronization information;
    using said at least two telegrams to transmit process data in the form of set point values to said at least one further participant via data fields, wherein a length of each data field depends on an amount and type of data transmitted, wherein each of said at least two telegrams represents data blocks, and wherein a synchronization information field is embedded into each of said data fields; and
    using the resultant synchronization information to synchronize further participants with the central participant,
    wherein the communication system is a distributed communication serial real time communication system of an automation system with a plurality of conveying and operating elements harmonized with respect to time, and
    wherein each of said at least one further participant is a component of said automation system, wherein said components are selected from the group consisting of sensors, actors and drives.

2. A method as defined in claim 1; and
    further comprising forming synchronization pulses based on each piece of synchronization information contained in the at least two telegrams; and applying logical operations to the synchronization pulses to form a resultant synchronization pulse to form the resultant synchronization information.

3. A method as defined in claim 2; and
    further comprising performing the logical operation as an ORing.

4. A method as defined in claim 2; and
    further comprising performing the logical operation as an ANDing.

5. A method as defined in claim 2; and
    further comprising after applying the logical operations to the synchronization pulses, discriminating the resultant synchronization pulse out of a resultant signal.

6. A method as defined in claim 1; and
    further comprising before the logical operations are applied, shifting the synchronization pulses such that they are substantially superimposed.

7. A method as defined in claim 6; and
    further comprising delaying both synchronization pulses with respect to time, with differences being the delays corresponding to time intervals between receipts of the two synchronization pulses by the further participant.

8. A method as defined in claim 1; and
    further comprising coupling a drive control to a resultant synchronization pulse.

9. A method as defined in claim 1; and
    further comprising using as the resultant synchronization information, synchronization information from a predetermined one of the at least two telegrams.

10. A method as defined in claim 1; and
    further comprising embedding the synchronization information in Ethernet telegrams.

11. A method as defined in claim 1; and further comprising transmitting the at least two telegrams containing the synchronization information by the central participant to the at least one further participant along different transmission paths.

12. A method as defined in claim 5; and
    further comprising using a monoflop to discriminate the resultant synchronization pulse.

13. A method as defined in claim 5; and
    further comprising designing a monoflop duration to be greater than an expected jitter of the at least two synchronization pulses.

14. A method as defined in claim 5; and
    further comprising using discrimination with respect to time to discriminate the resultant synchronization pulse.

15. A redundant communication system, comprising:
    a central participant;
    at least one further participant, wherein at least one of said at least one further participant is synchronized with the central participant by transmitting at least two telegrams containing synchronization information by the central participant to the at least one further participant;
    means for forming resultant synchronization information based on the synchronization information contained in the at least two telegrams, and
    using the resultant synchronization information to synchronize the further participant with the central participant,
    wherein said at least two telegrams are configured to transmit process data in the form of set point values to said at least one further participant via data fields, wherein each of said at least two telegrams represents data blocks, wherein a length of each data field depends on an amount and type of data transmitted, and wherein a synchronization information field is embedded into each of said data fields,
    wherein the communication system is a distributed communication serial real time communication system of an automation system with a plurality of conveying and operating elements harmonized with respect to time, and
    wherein each of said at least one further participant is a component of said automation system, wherein said components are selected from the group consisting of sensors, actors and drives.

16. A redundant communication system as defined in claim 15, wherein the communication system is a distributed communication system for decentralized control with a master-slave structure.

17. A redundant communication system as defined in claim 15, wherein the communication system is located in a structure selected from the group consisting of a redundant ring structure, a redundant linear topology, and a redundant star topology.

18. A redundant communication system as defined in claim 15, wherein the communication system is based on Ethernet physics.

19. A redundant communication system as defined in claim 17, wherein the redundant ring structure is a double ring structure.

20. An automation system, comprising:
- a communication system including a central participant;
- at least one further participant synchronized with the central participant by transmitting at least two telegrams containing synchronization information by the central participant to the at least one further participant; and
- means for forming resultant synchronization information based on the synchronization information contained in the at least two telegrams and using the resultant synchronization information to synchronize the further participant with the central participant;
- a control unit;
- at least one further unit selected from the group consisting of a drive unit, an input unit, and an output unit, the control unit being connected with the central participant, and said further unit being connected with one of further participants, wherein said at least two telegrams are configured to transmit process data in the form of set point values to said at least one further participant via data fields, wherein a length of each data field depends on an amount and type of data transmitted, wherein each of said at least two telegrams represents data blocks, and wherein a synchronization information field is embedded into each of said data fields, wherein the communication system is a distributed communication serial real time communication system of an automation system with a plurality of conveying and operating elements harmonized with respect to time, and wherein each of said at least one further participant is a component of said automation system, wherein said components are selected from the group consisting of sensors, actors and drives.

* * * * *